US012526256B2

United States Patent
Zhou et al.

(10) Patent No.: US 12,526,256 B2
(45) Date of Patent: Jan. 13, 2026

(54) TRAFFIC PATTERN-BASED PREDICTION OF CLOUD FIREWALL COSTS FOR OPTIMAL CLOUD FIREWALL DEPLOYMENT

(71) Applicant: Palo Alto Networks, Inc., Santa Clara, CA (US)

(72) Inventors: Shangde Zhou, Saratoga, CA (US); Sheng Meng, Sunnyvale, CA (US); Shu Lin, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 494 days.

(21) Appl. No.: 17/557,989

(22) Filed: Dec. 21, 2021

(65) Prior Publication Data

US 2023/0198949 A1 Jun. 22, 2023

(51) Int. Cl.
*H04L 29/06* (2006.01)
*G06F 18/214* (2023.01)
*G06N 3/08* (2023.01)
*H04L 9/40* (2022.01)

(52) U.S. Cl.
CPC ........ *H04L 63/0263* (2013.01); *G06F 18/214* (2023.01); *G06N 3/08* (2013.01); *H04L 63/0236* (2013.01); *H04L 63/20* (2013.01)

(58) Field of Classification Search
CPC ......... H04L 63/10; H04L 63/20; H04L 63/02; H04L 63/0218; H04L 63/0263; H04L 63/0236

USPC .......................................................... 726/11
See application file for complete search history.

(56) References Cited

U.S. PATENT DOCUMENTS

| 10,031,785 | B2 * | 7/2018  | Gonzalez .............. G06F 9/5083 |
| 10,873,541 | B2   | 12/2020 | Alvarez Callau et al.              |
| 11,411,933 | B2 * | 8/2022  | Mihai ................... G06F 13/102 |
| 11,818,056 | B2 * | 11/2023 | Jijumon .............. H04L 41/0897 |
| 2020/0151014 | A1 * | 5/2020  | Sukhi ...................... G06F 9/505 |
| 2021/0174280 | A1 * | 6/2021  | Ratnapuri ........ G06Q 10/06315 |

OTHER PUBLICATIONS

"App ID", Palo Alto Networks, Inc. Solution Brief, 2021, 5 pages.
(Continued)

*Primary Examiner* — Longbit Chai
(74) *Attorney, Agent, or Firm* — Gilliam IP PLLC

(57) ABSTRACT

Traffic log data generated by cloud firewalls executing in a cloud environment during a time period that indicate classes and corresponding amounts of network traffic detected across sessions as well as usage cost data recorded for the cloud firewalls during the time period are obtained. The traffic log data are preprocessed to generate training data comprising feature vectors indicating the aggregate amount of network traffic detected for each traffic class during a corresponding time interval within the time period and are labeled with the associated usage cost. A machine learning model is trained on the labeled traffic log data to learn the impact each traffic class has on the accumulated usage costs. The trained model generates predicted usage costs based on distributions of detected network traffic across traffic classes that are analyzed to correlate traffic patterns with usage costs to determine the optimal size(s) of cloud firewalls to deploy.

20 Claims, 7 Drawing Sheets

(56) References Cited

OTHER PUBLICATIONS

Borkowski, et al., "Predicting Cloud Resource Utilization", Association for Computing Machinery, UCC '16: Proceedings of the 9th International Conference on Utility and Cloud Computing, Dec. 2016, pp. 37-42.
Mehmood, et al., "Prediction of Cloud Computing Resource Utilization", IEEE, 2018 15th International Conference on Smart Cities: Improving Quality of Life Using ICT & IoT (HONET-ICT), Oct. 2018, pp. 38-42.
Nawrocki, et al., "Cloud Resource Demand Prediction using Machine Learning in the Context of QoS Parameters", J Grid Computing 19, 20 (2021), May 8, 2021, 20 pages.
Rahman, et al., "Auto-scaling VNFs using Machine Learning to Improve QoS and Reduce Cost", IEEE, 2018 IEEE International Conference on Communications (ICC), Jul. 31, 2018, 5 pages.

\* cited by examiner

TRAFFIC PATTERN-BASED PREDICTION OF CLOUD FIREWALL COSTS FOR OPTIMAL CLOUD FIREWALL DEPLOYMENT

BACKGROUND

The disclosure generally relates to digital data processing and to allocation of resources.

Cloud service providers ("CSPs") are providers of cloud computing technology, including cloud computing services for Infrastructure-as-a-Service (IaaS), Platform-as-a-Service (PaaS), and Software-as-a-Service (SaaS). CSPs can offer IaaS, PaaS, and/or SaaS, which provide cloud-based infrastructure, cloud-based platforms, and cloud-based applications, respectively. With the growing accessibility of cloud computing technology and increasing prevalence of CSPs, vendors of traditionally on-premises hardware and software technology are shifting towards cloud-based services, such as by delivering applications as SaaS applications, providing cloud-based storage options in addition to local storage, and offering cloud-based networking devices such as firewalls with firewall-as-a-service (FWaaS) solutions. Similarly, companies and users are migrating to the cloud at an increasing rate. Cloud-based services are generally priced more flexibly than their on-premises counterparts, with pricing often based on usage or on a pay-as-you-go model.

BRIEF DESCRIPTION OF THE DRAWINGS

Aspects of the disclosure may be better understood by referencing the accompanying drawings.

DESCRIPTION

Figure 1:
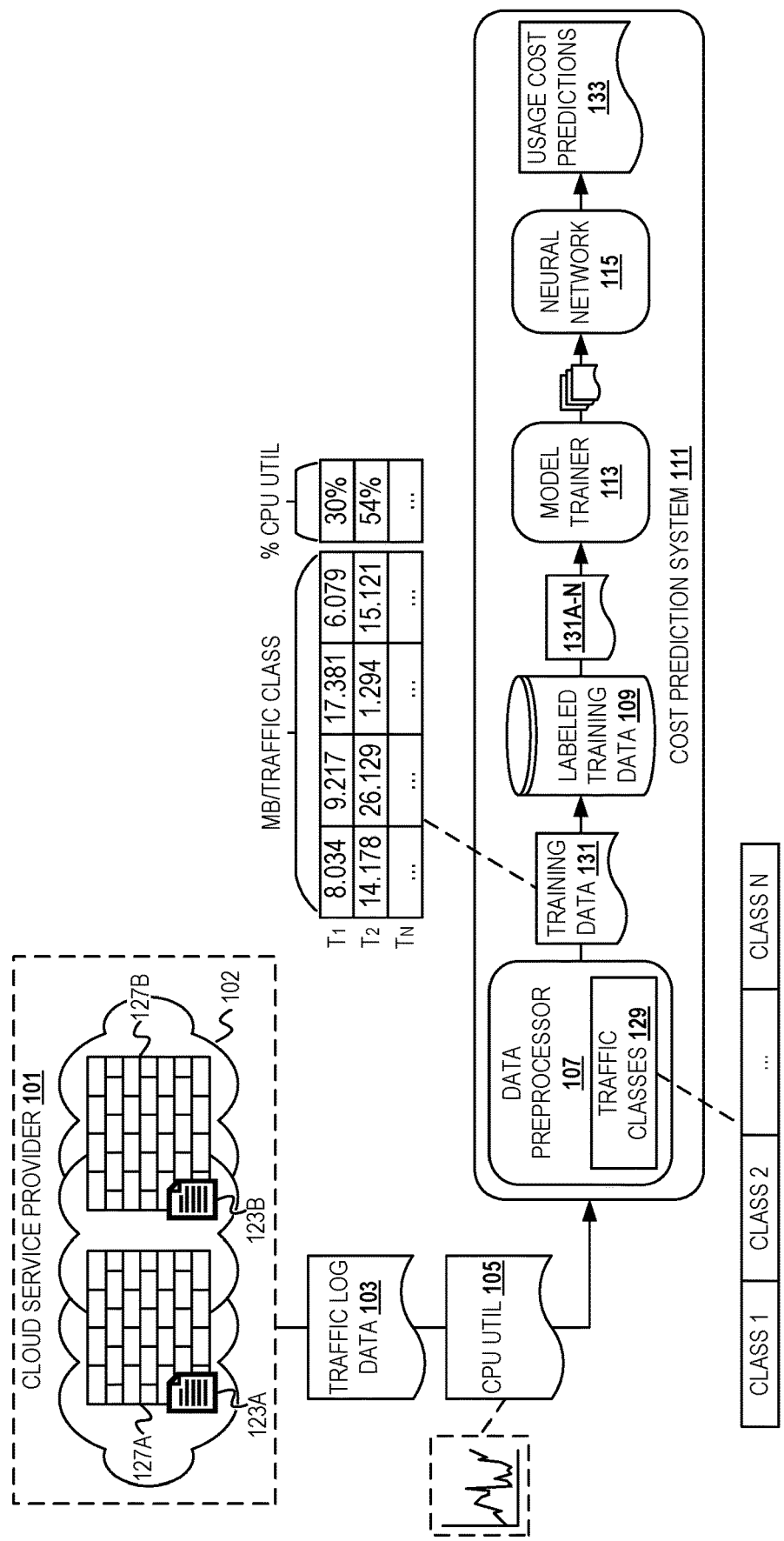
FIG. 1 is a conceptual diagram of building a model that generates predictions of operating costs for cloud-based firewalls based on observed usage of the firewalls.

The description that follows includes example systems, methods, techniques, and program flows that embody aspects of the disclosure. However, it is understood that this disclosure may be practiced without these specific details. For instance, this disclosure refers to three layer deep neural networks in illustrative examples. Aspects of this disclosure can be instead applied to other architectures for implementation of deep learning. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud," this description is referring to the resources of a CSP. For instance, a cloud can encompass the servers, virtual machines, and storage devices of a CSP. The servers, virtual machines, or other resources of the cloud service provider on which software (e.g., applications and server software) can be deployed are referred to as "cloud instances." In more general terms, a CSP resource accessible to customers is a resource owned/managed by the CSP that is accessible via network connections. Often, the access is in accordance with an application programming interface or software development kit provided by the CSP.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

The flexibility provided by utilizing cloud-based rather than on-premises networking devices introduces a tension between sufficient resource provisioning and cost management. For instance, a security vendor or other provider of cloud-based firewalls to customers may offer to deploy firewalls of a given size to be used by the customer as part of autoscaling of cloud firewalls. Cloud firewall size may be in terms of the number of supported virtual central processing units (vCPUs), memory capacity, bandwidth, or a combination thereof. A provider of cloud firewalls may be unaware of whether the quantity and/or sizes of cloud firewalls is optimal in terms of minimizing costs for maintenance and usage of the cloud firewalls while also providing quality service to customers without unacceptable latencies resulting from insufficient firewall availability, such as to satisfy a service-level agreement.

Described herein are techniques for learning the relationship between traffic patterns in terms of classes of detected network traffic and the associated usage costs of cloud-based firewalls that detect and inspect the network traffic. A system obtains traffic log data generated by one or more firewalls executing in a cloud environment during a first time period (e.g., traffic logs generated during the last 24 hours, last week, etc.). The traffic log data indicate classes of network traffic, such as application-based traffic classes, and a corresponding amount of network traffic detected across sessions corresponding to each traffic class. The system also obtains values of usage cost metrics recorded for each firewall during the first time period. Metrics which measure cost of usage include central processing unit (CPU) utilization, memory utilization, CPU credits, monetary cost, and/or another representation of cost or any data of the firewall from which monetary cost can be determined. The system preprocesses the traffic log data and usage cost metrics to create training data for training a machine learning model, where the training data comprise feature vectors corresponding to a plurality of time intervals within the first time period (e.g., feature vectors corresponding to 15 minute increments within 24 hours). Each feature vector of the created training data comprises the aggregate amount of network traffic detected for each traffic class during the associated time interval and is labeled with the usage cost recorded during the time interval. The feature vectors thus can be considered to correspond to traffic patterns at various times and are labeled with usage costs incurred as a result of detection and inspection of network traffic of the observed patterns.

The system trains the machine learning model on the labeled traffic log data to learn the impact each traffic class has on the cost of usage of the firewalls accumulated as a result of firewall inspection. Once trained, the machine learning model generates predictions of usage costs that will be accumulated based on distributions of detected network traffic across traffic classes that are inspected by deployed firewalls. Predicted usage costs can then be analyzed to correlate traffic patterns observed at different times with an optimal set of firewalls to deploy in terms of sizes and/or quantities. An optimal set of firewalls is that associated with the minimal cost for the provider of the firewalls while also accommodating the observed usage of the firewalls (e.g., without introducing undesired latencies).

Example Illustrations

FIG. 1 is a conceptual diagram of building a model that generates predictions of operating costs for cloud-based firewalls based on observed usage of the firewalls. A cost prediction system ("system") 111 predicts the costs associated with firewalls that run in a cloud 102 offered by a CSP 101 based on patterns in detected network traffic. While this description refers to firewalls running in the cloud 102, the cloud 102 can encompass resources of the CSP 101 that span across one or more regions such that the firewalls running in the cloud 102 may correspond to one or more regions made available by the CSP 101. The cloud 102 comprises a plurality of cloud resources allocated to a cloud account that are logically isolated from other cloud resources in a public cloud environment. For instance, the cloud 102 may be a virtual private cloud (VPC).

A firewall 127A and a firewall 127B are deployed to the cloud 102. The firewalls 127A-B are cloud-based firewalls that are at least capable of traffic classification based on deep packet inspection. The firewalls 127A-B can execute on a corresponding cloud instance(s) (e.g., virtual machine(s)/server(s)) provisioned for the cloud 102). The firewalls 127A-B may classify network traffic detected for each session by application, category of traffic (e.g., as a combination of port and protocol), or any other traffic class where network traffic having similar characteristics is classified together. Characteristics of network traffic can include, for each session, source/destination zones, Internet Protocol (IP) address, source/destination port, total bytes transmitted and/or received, or any other characteristic that can be determined from firewall and deep packet inspection. The firewall 127A and firewall 127B generate log data for each session based on inspection of detected network traffic that are recorded to a traffic log 123A and a traffic log 123B, respectively. Traffic log data recorded to the logs 123A-B indicate the characteristics of the network traffic corresponding to a session as well as the determined traffic class. The traffic class may be indicated with an identifier of the application, category, or other traffic class determined by the respective one of the firewalls 127A-B.

The entity that manages the firewalls 127A-B (e.g., a security vendor or other provider of cloud-based firewalls) accumulates costs of operation of the firewalls 127A-B executing on resources of the CSP 101 based at least partially on how the firewalls 127A-B are used since usage of the firewalls 127A-B impacts usage of resources provisioned for the cloud 102. Usage of the firewalls 127A-B may be defined in terms of the amount of traffic detected and inspected by the firewalls 127A-B. Examples of representations of usage costs thus associated with each of the firewalls 127A-B include CPU utilization, memory utilization, virtual CPU credits, or monetary costs. CPU utilization, memory utilization, virtual CPU credits, etc. are representative of actual monetary costs incurred for maintaining and using firewalls and are thus considered types of usage costs as described herein. This example refers to measured CPU utilization as an example usage cost for the firewalls 127A-B, though other costs of measured usage or combinations thereof can be utilized among implementations.

The system 111 obtains traffic log data 103 generated by the firewalls 127A-B and CPU utilization data 105 recorded for the firewalls 127A-B. To obtain the traffic log data 103, the system 111 may send a request(s) to the firewalls 127A-B to obtain the traffic log data 103 which the firewalls 127A-B generated during a period of time designated in the request (e.g., traffic log data generated over the last 24 hours, week, etc.). The duration of log generation may be a configurable setting of the system 111 and/or a parameter value provided to the system 111 at the time that the cost prediction is requested. The traffic log data 103 comprise characteristics of network traffic logged for each session tracked by the firewalls 127A-B and bytes transmitted and received during the session. Each of the entries of the traffic log data 103 also indicate a traffic class associated with traffic of the corresponding session. Traffic classes may be applications, application or traffic categories, or any other grouping of network traffic having similar characteristics. The traffic classes indicated in the traffic log data 103 were determined by the firewalls 127A-B from inspection of detected network traffic.

The CPU utilization data 105 may be obtainable from the firewalls 127A-B themselves or from a service that manages deployment of firewalls 127A-B with which the system 111 can communicate. In either case, the system 111 can submit a request(s) to obtain the CPU utilization of each of the firewalls 127A-B via a respective application programming interface (API) (e.g., an API of the firewall management service). CPU utilization data should be obtained for a substantially similar time period as that corresponding to the traffic log data 103. For instance, the system 111 may also indicate the time period submitted in the request to obtain the CPU utilization data 105. The CPU utilization data 105 indicate the percent utilization of the vCPUs allocated to the firewalls 127A-B. The CPU utilization data 105 may be represented as a plot(s) of CPU utilization for the time period (e.g., for the past 24 hours), where each data point corresponds to a timestamp and the recorded CPU utilization at that time. Timestamps may be at designated increments within the time period corresponding to the plot, such as increments of 15 minutes, 30 minutes, etc. The CPU utilization data 105 may be aggregated across cloud firewalls deployed to the cloud 102, or aggregated for the firewalls 127A-B, or may comprise CPU utilization data for each of the firewalls 127A-B. In the case of the latter, the system 111 may aggregate the CPU utilization data for the firewalls 127A-B to generate a set of aggregated CPU utilization data for the time period. As an illustrative example, the CPU utilization data 105 may be aggregated percent CPU utilization for the firewalls 127A-B, where the system aggregates (e.g., adds) CPU utilization metric values recorded for each of the firewalls 127A-B associated with each timestamp within the time period for which the CPU utilization data 105 were obtained and determines the percent CPU utilization with respect to the available vCPUs. Thus, the aggregate CPU utilization will be scaled to the total vCPU availability across cloud firewalls deployed to the cloud 102.

A data preprocessor 107 of the system 111 preprocesses the traffic log data 103 and the CPU utilization data 105 to generate training data 131. The data preprocessor 107 may iterate through the traffic log data 103 and CPU utilization data 105 at fixed intervals of time to determine the magnitudes of network traffic detected for each of a set of traffic classes 129 during a time interval and the corresponding CPU utilization recorded during that time interval. The time interval may correspond to the increments between timestamps associated with recorded CPU utilization as reflected in the CPU utilization data 105 or can be another value with which the data preprocessor 107 was configured. As an example, the CPU utilization data 105 may comprise recorded CPU utilization at 15 minute increments, so the time intervals may thus also be 15 minute intervals.

To illustrate the iteration over the traffic log data 103 and CPU utilization data 105 at a plurality of time intervals, the data preprocessor 107 can instantiate a time interval at the beginning of the time period for which the data 103, 105 were obtained so that traffic log data and CPU utilization recorded during the time interval can be analyzed. The data preprocessor 107 can maintain a set of traffic classes into which the firewalls 127A-B may classify detected network traffic for which the magnitudes are to be determined. In this example, the data preprocessor 107 maintains a data structure that stores traffic classes 129 that indicate identifiers of N traffic classes. For each time interval, the data preprocessor 107 can thus iterate through each of the traffic classes 129 and determine the magnitude in terms of bytes, megabytes (MB), gigabytes (GB), etc. of network traffic detected for the traffic class based on amounts of transmitted/received network traffic recorded for one or more sessions indicated in the traffic log data 103 that correspond to the traffic class (e.g., based on the identifier of the traffic class). The data preprocessor 107 may perform additional preprocessing for the determined magnitude prior to storage in the feature vector (e.g., by determining the norm of the magnitude). The determined magnitude is stored in a corresponding index of a feature vector corresponding to the time interval. Thus, each of the feature vectors of the training data 131 correspond to an interval of time, and indices of each feature vector correspond to respective ones of the traffic classes 129. For each feature vector, the data preprocessor also determines the CPU utilization recorded during the time interval based on the timestamp(s) of the CPU utilization data 105 and labels the feature vector with the CPU utilization. Upon generation of feature vectors of the training data 131, the data preprocessor 107 inserts the training data 131 into a repository 109 of labeled training data.

A model trainer 113 of the system 111 trains a neural network 115 on training data 131A-N to generate predictions of usage costs associated with detection and inspection of network traffic by the firewalls 127A-B. The model trainer 113 can initialize the neural network 115 with a set of hyperparameters that the model trainer 113 may maintain. For instance, the neural network 115 may be a three layer deep neural network initialized with a first set of weights. The model trainer 113 retrieves at least a subset of the training data 131 from the repository 109 and trains the neural network 115 to generate usage cost predictions 133 until one or more criteria for terminating training are satisfied. The training termination criteria may be a number of epochs to be completed during training and/or an error threshold. Use of the neural network 115 that has been trained, is described in reference to FIG. 2.

Figure 2:
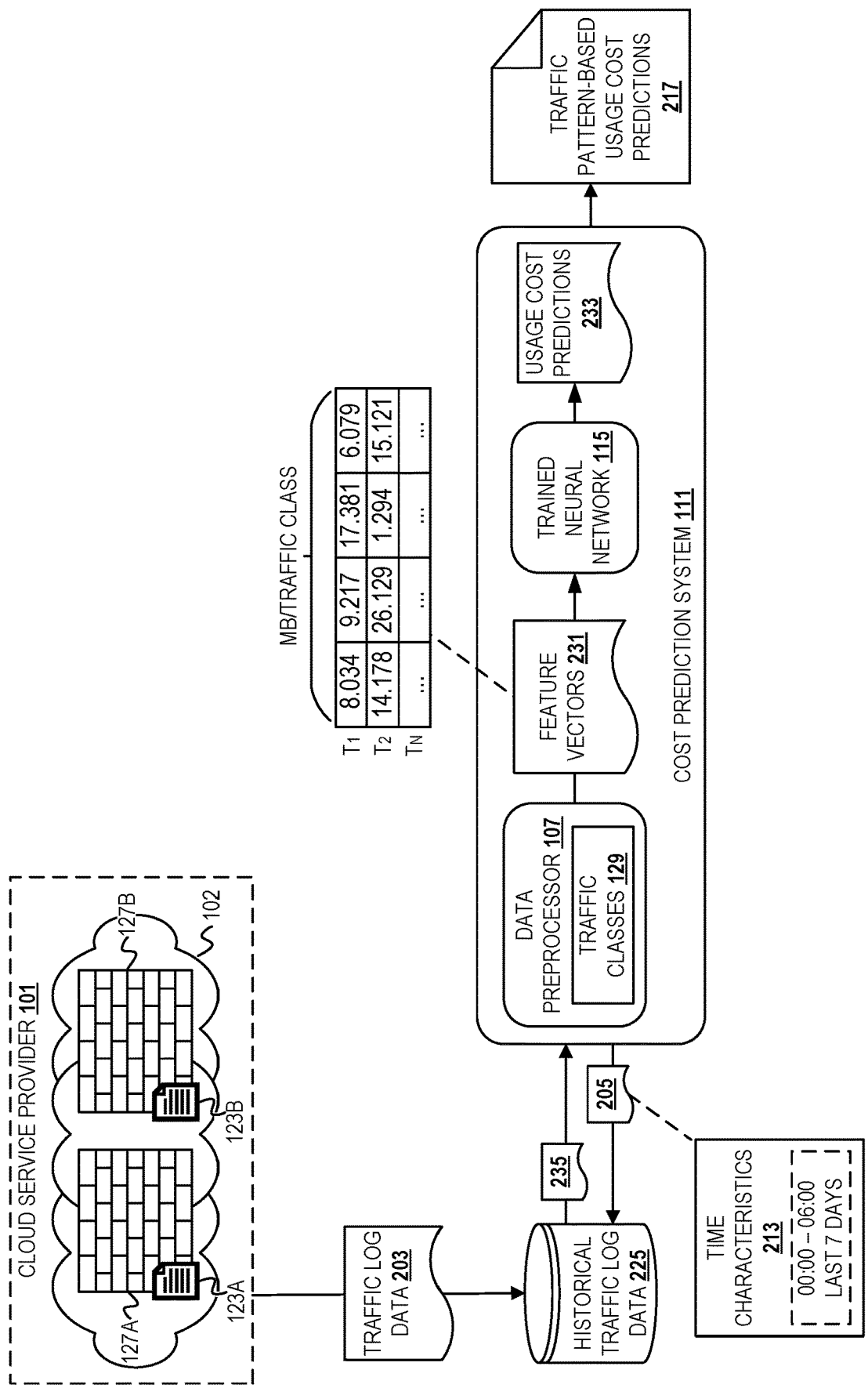
FIG. 2 is a conceptual diagram of predicting usage costs of firewalls deployed to a cloud environment based on patterns in detected network traffic.

FIG. 2 is a conceptual diagram of predicting usage costs of firewalls deployed to a cloud environment based on patterns in detected network traffic. FIG. 2 depicts the system 111 with the neural network 115 after it has been trained, which is hereinafter referred to as the trained neural network 115. The trained neural network 115 accepts input feature vectors that indicate distributions of network traffic across a set of traffic classes and outputs a corresponding usage cost of cloud firewalls predicted to be incurred from detection and inspection of network traffic having that distribution. In this example, traffic log data generated by the firewalls 127A-B, including traffic log data 203, are stored in a repository 225 of historical traffic log data. The repository 225 stores at least a subset of traffic log data generated by the firewalls 127A-B. Like the traffic log data 103 described in reference to FIG. 1, traffic log data stored in the repository 225 comprise characteristics of network traffic logged for sessions tracked by the firewalls deployed to the cloud 102, bytes transmitted and received during each session, and a corresponding traffic class into which one of the cloud firewalls classified the detected network traffic based at least partly on deep packet inspection. Collection and storage in the repository 225 of traffic log data can be intermittent or based on sampling of traffic log data obtained for other traffic analyses, for example.

The system 111 submits a query 205 to the repository 225 that indicates time characteristics 213. Time characteristics can be days of the week, a timeframe, month(s), etc. that can be identified from timestamps associated with sessions recorded in the repository 225 (e.g., based on session start/stop times). The time characteristics 213 may be parameter values passed to the system 111 in a request to generate predictions of usage costs. The repository 225 may expose an API by which queries can be submitted to facilitate conversion of time characteristics to searches of timestamps associated with traffic log data. In this example, the time characteristics 213 indicate a time corresponding to 00:00 to 6:00 (i.e., 12 AM to 6 AM) for the last seven days. Results 235 returned in response to the query 205 thus indicates traffic log data stored in the repository 225 that corresponds to sessions logged between 00:00 to 6:00 in the past week.

A data preprocessor 107 determines the magnitudes of network traffic in each of the set of traffic classes 129 recorded in the historical traffic log data returned in the results 235. For cases where the time characteristics indicate a timeframe, such as in this example, the data preprocessor 107 can determine the magnitudes of network traffic detected for each of the traffic classes 129 during the timeframe on each day returned in the results 235. In this example, the data preprocessor 107 determines the magnitudes of network traffic detected for each of the traffic classes 129 between the hours of 00:00 to 6:00 on each day of the last seven days. The data preprocessor 107 can determine the magnitudes of network traffic by iterating through the results 235 indicating historical traffic log data for each day (i.e., for each period from 00:00 to 6:00) and, for each traffic class given by the traffic classes 129, aggregating the bytes recorded for sessions indicating the traffic class and storing the aggregated bytes in a corresponding entry of a feature vector. The order in which aggregated bytes are stored in feature vectors should be the same order as was used for feature vectors input for training and may be given by a data structure maintained by the data preprocessor 107. As a result of iterating over the historical traffic log data retrieved from the repository 225 and aggregating the network traffic detected for each traffic class of the traffic classes 129 on each day, the data preprocessor 107 generates feature vectors 231. In this example, each of the feature vectors 231 will correspond to magnitude of network traffic detected for each traffic class in terms of total MB between 00:00 and 6:00 on a corresponding day, and there will thus be seven feature vectors in total. In some examples, instead of generating a feature vector for each day, the data preprocessor 107 may average the magnitudes determined for each of the traffic classes 129 on each day and generate a single feature vector indicating the average magnitudes for the traffic classes 129.

The data preprocessor 107 inputs each of the feature vectors 231 into the trained neural network 115 to obtain usage cost predictions 233 from output. In this example, each of the usage cost predictions 233 will indicate the predicted CPU utilization corresponding to the respective one of the feature vectors 231 provided to the trained neural network 115 as input. The system 111 may aggregate (e.g., average) each of the usage cost predictions 233 to generate a single prediction representative of the predictions output for each of the feature vectors 231. The system 111 indicates traffic-pattern based usage cost predictions ("predictions") 217 that indicate each of the usage cost predictions 233 and corresponding time characteristics 213 for which the predictions were generated. The predictions 217 may also include the average usage cost prediction (e.g., average predicted CPU utilization) if the usage cost predictions 233 were averaged. For instance, the system 111 can generate a report or notification that includes the predictions 217. The usage costs indicated in the predictions 217 are representative of predicted CPU utilization(s) by deployed firewalls between the hours of 00:00 and 06:00 indicated in the time characteristics 213 based on the historical traffic log data that indicate recent patterns in network traffic detected during these hours. The predictions 217 can subsequently be analyzed to inform decisions about scaling cloud firewalls during times given by the time characteristics 213 based on the predicted costs of usage of firewalls deployed to the cloud 102 during those times.

Figure 3:
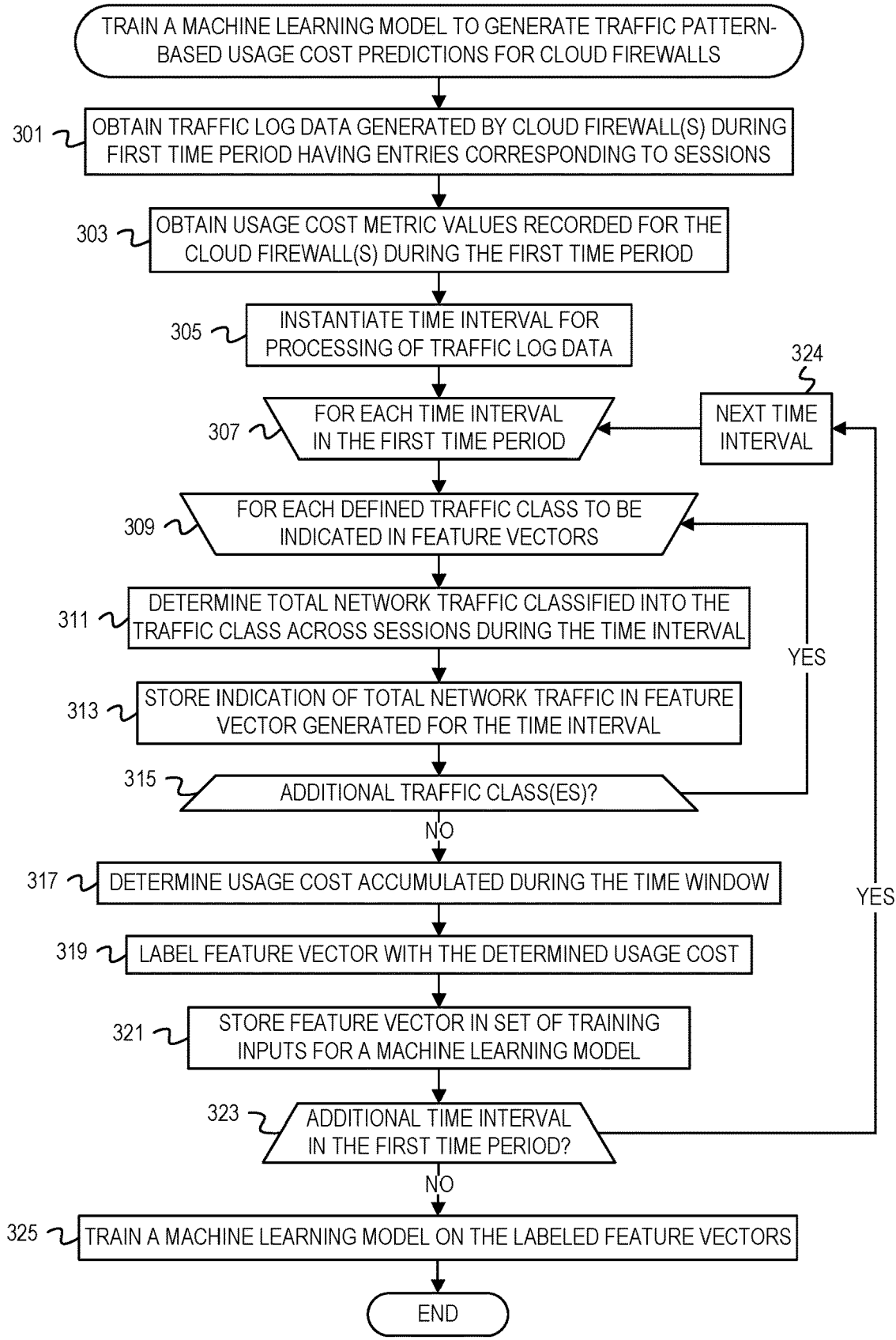
FIG. 3 is a flowchart of example operations for training a machine learning model to generate traffic pattern-based usage cost predictions for cloud firewalls.
Figure 4:
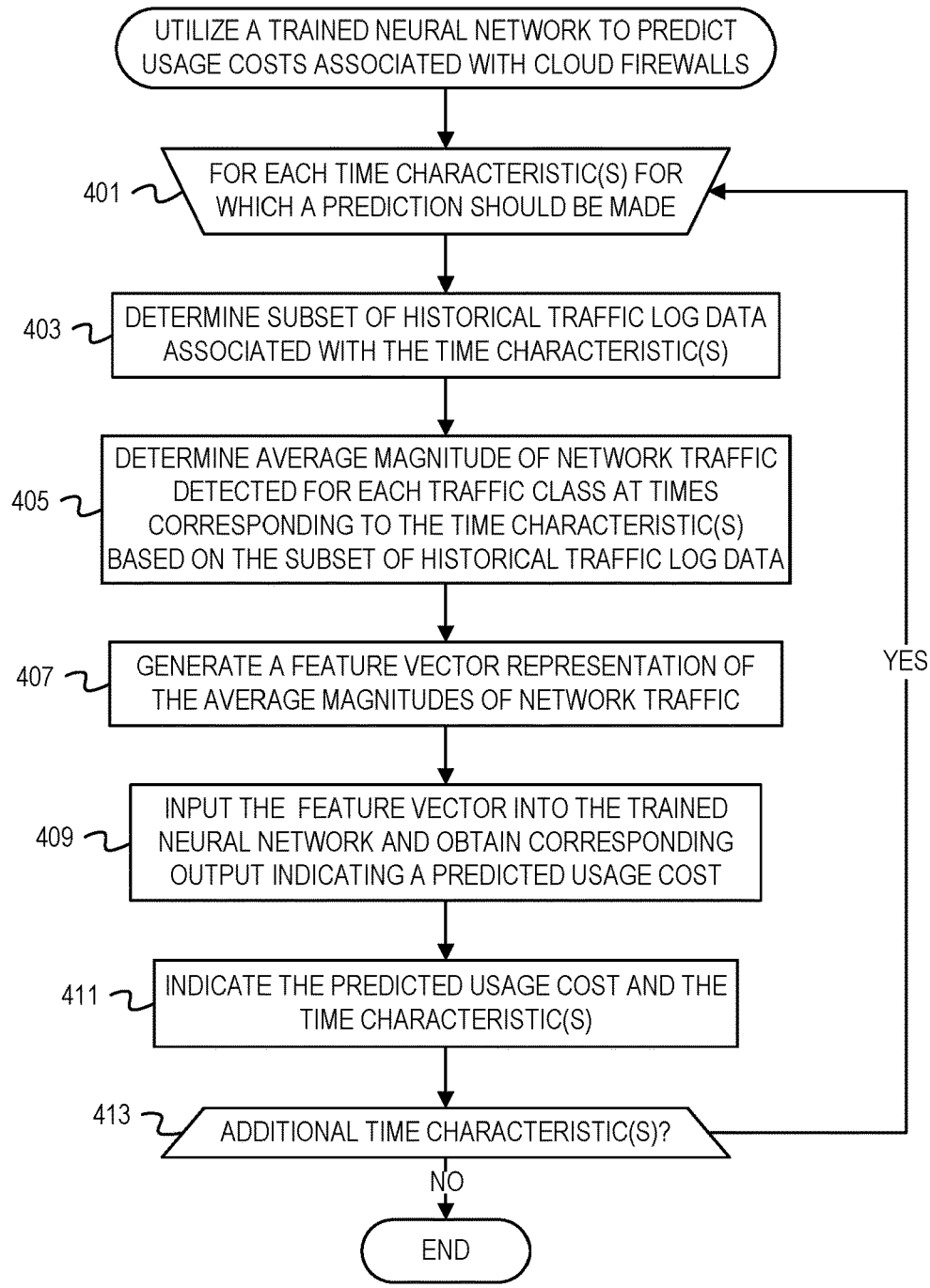
FIG. 4 is a flowchart of example operations for utilizing a trained neural network to predict usage costs associated with cloud firewalls.

FIGS. 3-4 are example operations for traffic pattern-based prediction of costs accumulated from inspection of network traffic by cloud firewalls and recommendation of cloud firewall sizes to provision to minimize costs. The example operations are described with reference to a cost prediction system (hereinafter "the system") for consistency with FIG. 1 and FIG. 2. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for training a machine learning model to generate traffic pattern-based usage cost predictions for cloud firewalls. The usage cost refers to costs associated with usage of cloud firewalls deployed to a cloud environment. Example metrics by which usage cost can be measured or represented include CPU utilization (i.e., percent utilization of vCPUs allocated to available cloud firewalls), memory utilization, monetary cost, vCPU credits, or any combination thereof. The cloud environment refers to the logically isolated cloud environment hosted in a public cloud offered by the CSP, such as a virtual private cloud within the public cloud.

At block 301, the system obtains traffic log data generated by one or more cloud firewalls running in a cloud environment during a first time period. The first time period can be a configurable setting of the system or may have been provided to the system as a parameter value. For instance, traffic log data retrieval can be performed according to a schedule (e.g., daily), where the first time period corresponds to the time between scheduled retrieval events. The system can obtain the traffic log data from the firewalls based on communication of a request(s) to the firewalls or from external storage where traffic log data generated by the firewalls are stored (e.g., from cloud storage or an external server), where the first time period is indicated in the request. As an example, the system can obtain traffic log data generated by deployed firewalls in the past 24 hours.

At block 303, the system obtains values of usage cost metrics recorded for the cloud firewall(s) during the first time period. The system can obtain the usage cost metric values by submitting a request(s) to a service/system which manages firewall deployment and monitors usage. The request may indicate an identifier(s) of the cloud environment to which the cloud firewall(s) has been deployed as well as the first time period. The request(s) may also indicate a type(s) of usage cost metric(s) for which recorded values are to be obtained (e.g., CPU utilization, memory utilization, monetary cost, etc.), which may also be a configurable setting of the system or a parameter value provided to the system. If a response to the request indicates values of usage cost metrics recorded for each of multiple cloud firewalls, the system can aggregate the values of the usage cost metrics that were recorded across firewalls. The usage cost metrics that are obtained may be associated with a plurality of timestamps corresponding to recorded values at each timestamp. As an illustrative example, the usage cost metrics may comprise CPU utilization metrics recorded at 15 minute increments within the time period.

At block 305, the system instantiates a time interval for processing of traffic log data. The time interval may correspond to the increments of timestamps at which the usage cost metrics were recorded. Returning to the previous example, the time interval may be an interval of 15 minutes corresponding to the elapsed time between CPU utilization measurements. During preprocessing of training data, the system can also instantiate the time interval for the obtained usage cost metrics so that the usage cost metrics associated with the timestamp(s) corresponding to the time interval can be determined.

At block 307, the system begins iterating through each time interval within the first time period. As an illustrative example, if the time interval is a 30 minute interval and the first time period is a 24-hour period, the system iterates through the 24-hour period at 30 minute intervals.

At block 309, the system begins iterating over each defined traffic class to be indicated in feature vectors, where defined traffic classes are those recognized by the cloud firewall(s) that perform traffic classification. The system may maintain a data structure storing indications of each traffic class of interest. For instance, the system may maintain a data structure comprising identifiers of 49 application-based traffic classes or other traffic classes and an additional traffic class for other or unknown traffic that could not be classified into a specific class, such as a class of traffic that could not be classified into any of the 49 application-based traffic classes. Since the network traffic corresponding to each traffic class should be stored in a same order of traffic classes across feature vectors, the order of iteration through the traffic classes is consistent across iterations over the traffic log data for the given time intervals.

At block 311, the system determines the total network traffic classified into the traffic class across sessions during the time interval. The system determines which sessions indicated in the traffic log data generated during the time interval indicate the traffic class, if any, and the corresponding magnitude of network traffic transmitted/received during the session(s) (e.g., total MB, GB, etc. of network traffic of sessions indicating the traffic class). Determination of sessions indicating the traffic class during the time interval can be based on start/end times of sessions indicating the traffic class (e.g., with an identifier of the traffic class) that are within or at least partially overlap with the time interval.

At block 313, the system stores an indication of the total network traffic in the feature vector generated for the time interval. The system stores the indication of total network traffic in an entry/position of the feature vector which corresponds to the traffic class, where the entry/position corresponds to the current iteration and order of traffic classes. For instance, on the first iteration, the system will store the total in the first entry (i.e., at index 0).

At block 315, the system determines if an additional traffic class remains for determination of network traffic magnitude. If an additional traffic class remains, operations continue at block 309. Otherwise, operations continue at block 317, where the system determines the usage cost recorded for the time interval. The system can determine the usage cost metric value(s) associated with the timestamp(s) corresponding to the time interval. If multiple usage cost metric values were recorded during the time interval, the system may aggregate (e.g., average) the metric values to generate an aggregate usage cost metric value.

At block 319, the system labels the feature vector with the determined usage cost. As a result, the feature vector stores magnitudes of metric traffic detected by a cloud firewall(s) for each traffic class of the set of traffic classes during the time interval and is labeled with the usage cost accumulated for the cloud firewall(s) as a result of detection/inspection of network traffic having that distribution across classes.

At block 321, the system stores the feature vector in a set of training inputs for a machine learning model. The system may maintain a database(s), repository(ies), etc. for storage of labeled feature vectors to be used as inputs to a machine learning model.

At block 323, the system determines if there is an additional time interval within the first time period. In other words, the system determines if the time interval can be incremented within the first time period. Returning to the previous illustrative example, the system may determine if there is an additional 30 minute time interval within the 24 hour time period. If there is an additional time interval, operations continue at block 324, where the system proceeds to the next time interval before continuing at block 307. Otherwise, if there are no additional time intervals within the first time period, operations continue at block 325.

At block 325, the system trains a machine learning model on the labeled feature vectors. The machine learning model can be a neural network that utilizes supervised learning for learning the relationship between magnitudes of network traffic detected by a cloud firewall(s) across the set of traffic classes and the usage cost incurred for the cloud firewall(s) from detection and inspection of network traffic having that distribution across traffic classes. For instance, the machine learning model may be a deep neural network with three layers. The system trains the neural network by initializing hyperparameters of the neural network, retrieving labeled feature vectors from the set of training data for input into the neural network, evaluating outputs of the neural network produced based on the input feature vectors and the corresponding labels (e.g., based on a cost function), and tuning the hyperparameters accordingly. The system can train the neural network for a certain number of epochs or until another training termination criterion is satisfied (e.g., the computed cost being below a threshold).

In FIG. 3, the example operations describe an example in which raw traffic log data and usage cost data are processed to generate the data for input to the machine learning model (e.g., a neural network). In other implementations, the data may have been previously processed to determine magnitudes of network traffic across traffic classes and any corresponding usage cost data. For instance, a file comprising the magnitudes of network traffic and corresponding CPU utilization determined for each of a plurality of time intervals may be provided to the system as input (e.g., in a CSV file, a file comprising tabular data, etc.). In this case, the system can preprocess the file through parsing and generate the labeled feature vectors from the parsed file. The neural network in this case can be trained on the labeled feature vectors that are determined from processing and parsing the file.

Additionally, FIG. 3 provides example operations for training the neural network can be performed based on input data obtained for a single cloud environment. In other implementations, the neural network can be trained based on input data corresponding to multiple cloud environments. For instance, the system can train the neural network based on traffic log data and cloud firewall usage metrics collected for firewalls deployed across multiple VPCs.

FIG. 4 is a flowchart of example operations for utilizing a trained neural network to predict usage costs associated with cloud firewalls. The example operations assume a neural network was trained as described in reference to FIG. 3. The trained neural network may have been trained on traffic log data and corresponding usage cost data recorded for one cloud environment or based on multiple cloud environments. Further, the example operations describe generation of input feature vectors based on raw historical traffic log data. In implementations, the system can obtain from input a file (e.g., in a comma-separated values (CSV) file, a file comprising tabular data, etc.) that comprises the historical traffic log data that have already been processed to a format described herein. In this case, the system can preprocess the file through parsing to generate the unlabeled feature vectors from each entry (e.g., row) in the column for input into the trained neural network.

At block 401, the system begins iterating over each time characteristic(s) for which a prediction should be made. The time characteristic(s) may be provided to the system as parameter values or may be received from input. As described above, time characteristics are characteristics that indicate the time at which traffic log data were generated. Time characteristics can be days of the week, months, times of day or time intervals, etc.

At block 403, the system determines a subset of the historical traffic log data that was logged during times specified by the time characteristic(s). The historical traffic log data may comprise the traffic log data recorded over the past week, past 30 days, past 60 days, etc. The system may filter or query the historical traffic log data based on the times associated with the sessions logged therein (e.g., the start/stop times) to determine the logged traffic that corresponds to the time characteristic based on timestamps of the sessions. To illustrate, for time characteristics of a time period of 12:00 PM to 6:00 PM, the system can filter the traffic log data to determine the sessions logged each day between 12:00 PM and 6:00 PM over the past week, past 30 days, etc.

At block 405, the system determines the average magnitude of network traffic detected for each traffic class at the time(s) corresponding to the time characteristic(s) based on the subset of historical traffic log data. The system can determine the average magnitudes based on first aggregating amounts of network traffic detected per class for each time interval corresponding to the time characteristic. Returning to the previous example, the system can determine the aggregate amounts of network traffic detected for each of the set of traffic classes during each 6-hour interval in the subset of results (i.e., corresponding to 12:00 PM to 6:00 PM each day) as described in reference to block 311 for each of the set of traffic classes. The system can then determine the average magnitudes of network traffic detected for each class by averaging the magnitudes of network traffic determined for each traffic class across the time intervals. The resulting average indicates the average distribution of network traffic across the set of classes during a times(s) given by the time characteristic.

At block 407, the system generates a feature vector representation of the average magnitudes of network traffic for each traffic class for input into the neural network. For instance, the system can store each of the average magnitudes in a vector, where the order of average magnitudes in the vector corresponds to the order of traffic classes used for generation of input feature vectors for training.

At block 409, the system inputs the feature vector into the trained neural network and obtains a corresponding output indicating a predicted usage cost. The predicted usage cost represents a predicted cost associated with detection and inspection of network traffic having the pattern represented by the feature vector by a cloud firewall(s) during a time given by the time characteristic(s). For instance, the output of the trained neural network may be a predicted percent utilization of available vCPUs by cloud firewalls between 12:00 PM and 6:00 PM based on average magnitudes of network traffic detected for each of the set of traffic classes during these hours.

At block 411, the system indicates the predicted usage cost and corresponding time characteristics. Usage cost predictions associated with one or more time characteristics may be considered representative of usage costs generally incurred for cloud firewalls during the time(s) given by the time characteristic(s). As an illustrative example, the usage cost predictions generated based on network traffic logged for an enterprise secured by the cloud firewall(s) may be predicted to be lower for time characteristics indicative of weekends and overnight periods due to low traffic outside of working hours than at peak hours during the workday during which the cloud firewall(s) experience higher traffic. The system may generate a report, notification, etc. indicating the prediction and associated time characteristic(s) for subsequent analysis to determine whether to scale cloud firewalls up or down during different times of day, days of the week, etc.

At block 413, the system determines if there is an additional time characteristic(s) for which a prediction of cloud firewall usage cost should be made. An additional time characteristic(s) may be remaining if another time characteristic(s) is/was provided to the system as a parameter value or is received from input, for example. If there is another time characteristic(s), operations continue at block 401. Otherwise, operations are complete.

Figure 5:
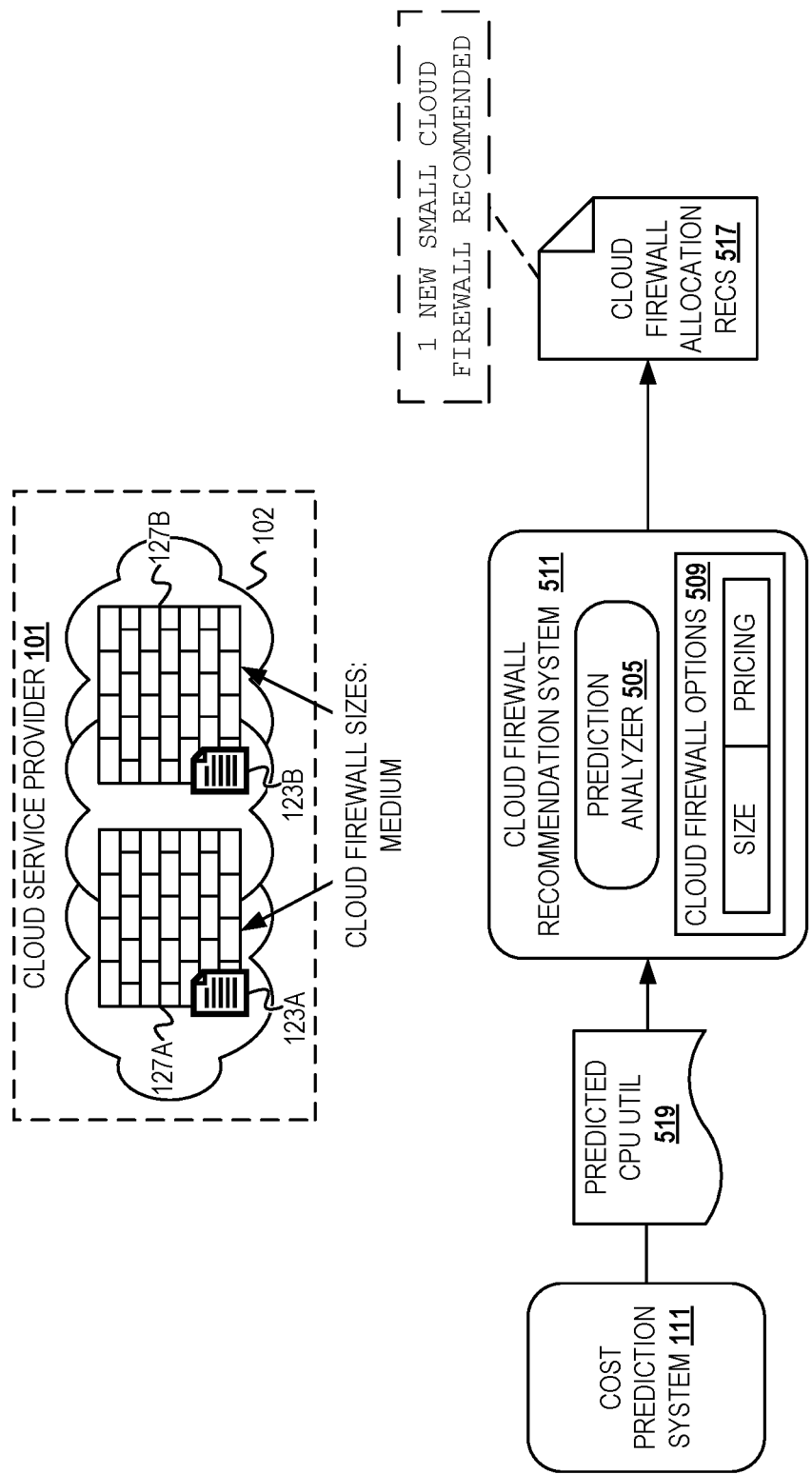
FIG. 5 is a conceptual diagram of determining cloud firewalls to deploy to accommodate predicted changes in detected network traffic while minimizing costs.

FIG. 5 is a conceptual diagram of determining cloud firewalls to deploy to accommodate predicted changes in detected network traffic while minimizing costs. A cloud firewall recommendation system ("system 511") generates recommendations of a count and/or size(s) of cloud firewalls that minimizes cost for the provider of the firewalls without sacrificing quality of service for the users of the firewalls. The system 511 may execute as part of a same system as the system 111 described in reference to FIG. 1 or may be separate. For instance, the system 111 and the system 511 may execute on the same server or may each execute on a respective server. FIG. 5 depicts the firewalls 127A-B executing on a cloud 102 offered by a CSP 101 as described in reference to FIG. 1. FIG. 5 also depicts an indication that the cloud firewalls 127A-B are medium-sized instances offered by the firewall provider (e.g., the security vendor). The firewall provider may offer different sizes of cloud firewalls suitable for varying workloads. Cloud firewall sizes may be represented in terms of the number of vCPUs supported for the cloud firewall, memory capacity, bandwidth, or a combination thereof.

The system 511 obtains at least a first predicted CPU utilization 519 from the system 111. The predicted CPU utilization 519 may be passed to the system 511 from output of a trained neural network as described in reference to FIG. 2. Alternatively, or in addition, the system 511 may query a repository comprising predicted usage costs for one or more time characteristics in which predictions were previously stored by the system 111 on output from the trained neural network. The predicted CPU utilization 519 is a predicted percent utilization of available CPUs of the CSP 101 by the firewalls 127A-B for a time given by a time characteristic(s) corresponding to the prediction (e.g., a particular day(s), time of day, timeframe, etc.). As an example, the predicted CPU utilization 519 may be a predicted percent CPU utilization of cloud firewalls between the hours of 08:00 to 17:00 (i.e., 8 AM to 5 PM) corresponding to predicted traffic patterns during these hours that was determined from historical traffic log data.

A prediction analyzer 505 determines whether to recommend scaling up or down of firewalls deployed to the cloud 102 based on the predicted CPU utilization 519. The prediction analyzer 505 may evaluate the predicted CPU utilization 519 based on a current CPU utilization of the firewalls 127A-B to determine whether the CPU utilization is predicted to substantially increase or decrease as a result of a change in network traffic patterns. The prediction analyzer 505 may determine the current CPU utilization associated with the cloud 102 based on requesting CPU utilization metrics from a service/system that manages deployment of firewalls to the cloud 102, where the system 111 and/or the system 511 may also be part of the firewall deployment management service/system. If the predicted CPU utilization 519 is substantially greater than the current CPU utilization (e.g., based on being greater by at least a first threshold amount and/or based on exceeding a second threshold that is greater than the current CPU utilization), the prediction analyzer 505 determines that the firewalls deployed to the cloud 102 should be scaled up to accommodate the increase in network traffic. If the predicted CPU utilization 519 is substantially less than the current CPU utilization (e.g., based on being lower by at least a first threshold amount and/or based on being below a second threshold that is less than the current CPU utilization), the prediction analyzer 505 determines that the firewalls deployed to the cloud 102 should be scaled down to conserve costs due to the predicted decrease in network traffic that will be inspected by cloud firewalls.

If the prediction analyzer 505 determines that the firewalls deployed to the cloud 102 should be scaled up or down, the prediction analyzer 505 determines which of a set of cloud firewall options ("options") 509 to recommend for deployment. The options 509 can vary among providers of cloud firewalls. The options 509 indicate sizes and pricing (e.g., cost based on percent CPU utilization, monthly cost, etc.) of each of the cloud firewalls that are available for deployment to the cloud 102. Sizes may be indicated in the options 509 in terms of quantitative characteristics of the cloud firewall (e.g., number of vCPUs supported for cloud firewalls of each size, memory capacity, etc.) and/or in terms of a qualitative description of each size (e.g., small, medium, large, etc.). The prediction analyzer 505 can determine which of the options 509 can optimally accommodate the predicted CPU utilization 519 by determining current usage of the resources made available by the firewalls 127A-B and the change in resource usage predicted as a result of the predicted CPU utilization 519. For instance, the prediction analyzer 505 can determine a current number of vCPUs available for the firewalls 127A-B (e.g., 4 vCPUs across the two firewalls). The current percent CPU utilization thus represents the percent utilization of the vCPUs across firewalls, and the predicted CPU utilization 519 can be analyzed to determine a change in usage of available vCPUs based on a difference between the current CPU utilization and the predicted CPU utilization.

For scaling up, the prediction analyzer 505 can determine the size indicated in the options 509 that has the minimal vCPU availability and corresponding price to support the increase in usage of the available vCPUs. If the predicted CPU utilization 519 indicates an increase of 25% utilization of the 4 vCPUs, the prediction analyzer 505 may select one of the options 509 that has 1 vCPU available to accommodate the 25% increase in utilization. If the predicted CPU utilization 519 indicates a decrease of 50% across the 4 vCPUs, the prediction analyzer 505 may select one of the options that has 1 vCPU available with which to replace one of the firewalls 127A-B since 3 vCPUs will accommodate the decrease network traffic without incurring the costs of larger instances that support 4 vCPUs.

The system 511 indicates the determined size(s) of cloud firewall(s) as recommendations 517 for cloud firewalls to deploy to the cloud 102 for accommodating the patterns in detected network traffic associated with the predicted CPU utilization 519 while minimizing costs to maintain the cloud firewall(s). The system 511 can generate a report, notification, etc. comprising the recommendations 517 and indicate the report or notification (e.g., via displaying). In this example, the recommendations 517 indicate that one small cloud firewall is recommended in addition to the two medium cloud firewalls 127A-B to accommodate the predicted increase in usage. The provider of firewalls executing in the cloud 102 can thus deploy an additional cloud firewall to the cloud 102 based on the recommendations 517. In some implementations, the system 511 may automate deployment/deletion of cloud firewalls based on the recommendations 517 as part of autoscaling.

Figure 6:
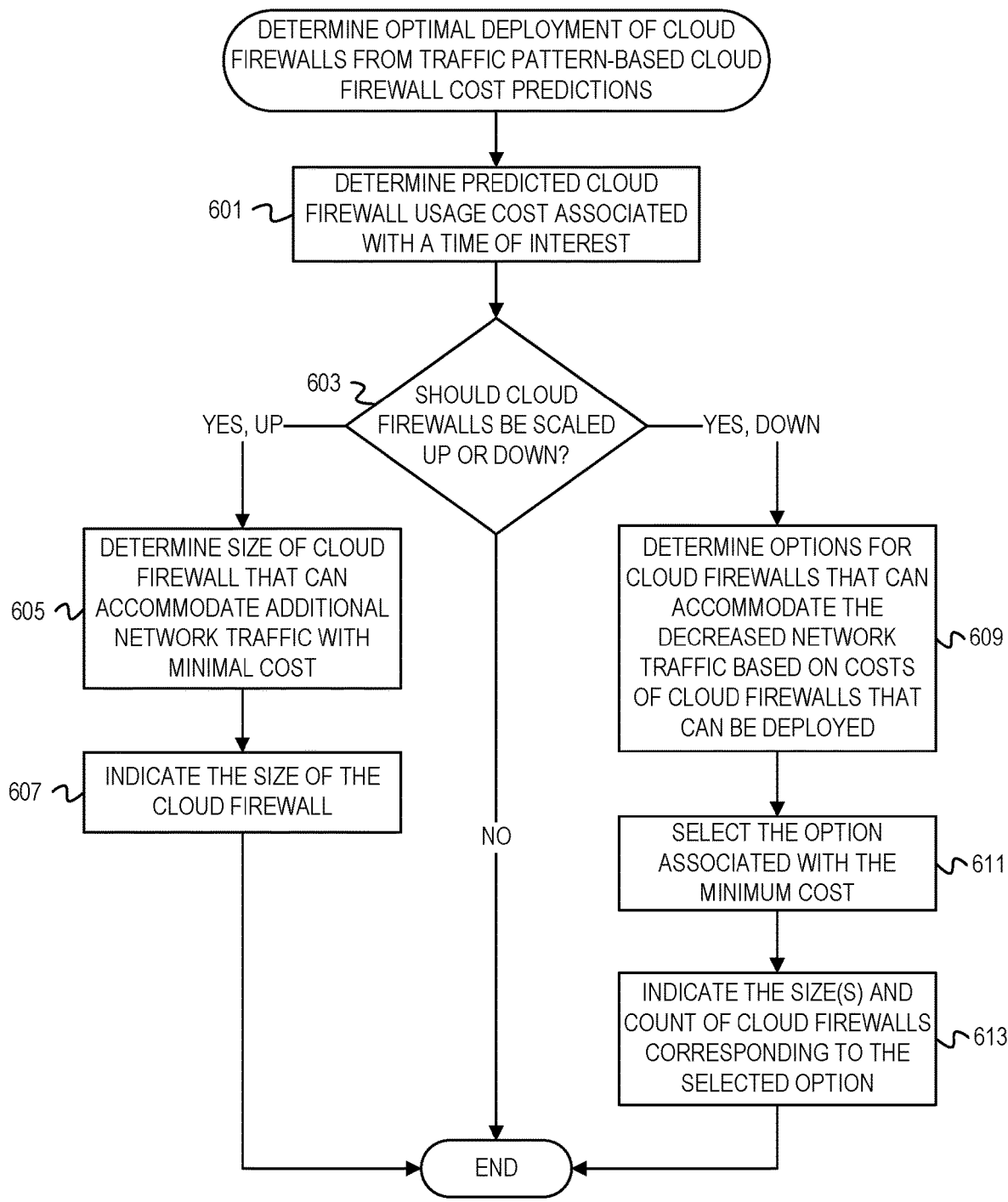
FIG. 6 is a flowchart of example operations for determining optimal deployment of cloud firewalls from traffic pattern-based cloud firewall cost predictions.

FIG. 6 is a flowchart of example operations for determining optimal deployment of cloud firewalls from traffic pattern-based cloud firewall cost predictions. The example operations are described with reference to a cloud firewall recommendation system (hereinafter "the system") for consistency with FIG. 5. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 601, the system determines a predicted cloud firewall usage cost generated for a time of interest. For instance, the predicted cloud firewall usage cost can be a percent of available vCPUs predicted to be utilized during the time of interest based on patterns in network traffic predicted for that time of interest. The system can obtain the predicted usage cost from output of a trained neural network as described above. The time of interest may be represented with a time characteristic(s) associated with the predicted usage cost. A time characteristic may be a day of the week, a month, a timeframe or time of day (e.g., 8 AM to 5 PM), etc. The time characteristic(s) may have been provided to the system as a parameter value(s) or may be indicated in a schedule according to which the system generates cloud firewall recommendations.

At block 603, the system determines whether available cloud firewalls should be scaled up or down. The system can determine whether available cloud firewalls should be scaled up or down based on determination of whether the predicted usage cost corresponds to an increase or a decrease in network traffic. An increase in network traffic that is detected/inspected will correspond to increased costs of usage of the available cloud firewalls, while a decrease in network traffic will correspond to decreased costs of usage of cloud firewalls. The system can evaluate the predicted usage costs based on a previously recorded or current usage cost to determine whether the predicted usage cost corresponds to a predicted increase or decrease in network traffic. For instance, if the predicted usage cost exceeds the current or previous usage cost by at least a threshold amount and usage has thus increased (e.g., an increase of at least 25% CPU utilization), cloud firewalls should be scaled up, and operations continue at block 605. If the predicted usage cost is below the current or previous predicted usage cost by at least a threshold amount and usage has thus decreased, cloud firewalls should be scaled down, and operations continue at block 609. If the predicted usage cost is within the threshold amount of the current or previous usage cost, the system determines that cloud firewalls should not be scaled up or down, and operations are complete.

At block 605, the system determines a size of cloud firewall that can accommodate the increase in network traffic with a minimal cost. The system can maintain indications of cloud firewall sizes that are available to deploy and corresponding pricing. Sizes of cloud firewalls may be represented in terms of vCPUs supported, memory capacity, etc., or any combination thereof. With respect to the example in which usage cost is represented with CPU utilization, the system can determine the size of cloud firewall to deploy that has the minimal cost while also supporting the increase in CPU utilization. For example, the system can determine the increase in percent CPU utilization relative to the total available CPUs and select the smallest size of cloud firewall that supports a number of vCPUs that can accommodate the percent increase.

At block 607, the system indicates the size of the cloud firewall. Indicating the size of cloud firewall can include generating a notification, report, etc. that indicates the cloud firewall size. In some implementations, the system can initiate deployment of the firewall of the recommended size to the cloud environment as part of autoscaling cloud firewalls.

At block 609, the system determines one or more options for cloud firewalls that can accommodate the decreased network traffic based on costs of cloud firewalls that can be deployed. As described above at block 605, the system can maintain indications of cloud firewall sizes that are available to deploy and corresponding pricing. With respect to the example in which usage cost is represented with CPU utilization, the system can determine the size(s) of cloud firewall to terminate or with which to replace an existing cloud firewall that has the minimal cost while also supporting the decrease in CPU utilization. For example, the system can determine the decrease in percent CPU utilization relative to the total available CPUs and select the smallest size(s) of cloud firewall that supports a number of vCPUs that can accommodate the percent decrease. If the selected cloud firewall(s) is a same size(s) as an existing cloud firewall(s), the system can determine that the other cloud firewall(s) in addition to that cloud firewall(s) should simply be terminated since the cloud firewall(s) of the determined size(s) can accommodate the decrease in network traffic.

At block 611, the system selects the option associated with the minimum cost. The option with the minimum cost is that which is associated with the lowest cost given by the cloud firewall pricing structure, such as the minimum monthly price, minimum CPU utilization-based price, etc.

At block 613, the system indicates the size(s) and count of cloud firewall(s) corresponding to the selected option. Indicating the size and count of cloud firewalls can include generating a notification, report, etc. that indicates the number and size(s) of cloud firewalls recommended for deployment. In some implementations, the system can initiate termination of surplus cloud firewalls as part of autoscaling of cloud firewalls. Initiation of cloud firewall termination can proceed after evaluation of the set of cloud firewalls that are currently deployed to determine whether any of the existing cloud instances are of the recommended size(s) within the determined count and thus should be maintained with the rest of the cloud firewalls terminated.

Variations

In some implementations, training of the neural network that generates predicted usage cost values can be ongoing. Ongoing learning for the neural network such as throughout different times of year allows for learning seasonal or gradual changes in traffic patterns that may impact cloud firewall usage costs. For instance, training of the neural network can be scheduled according to "off seasons" for the users serviced by the cloud firewall(s) (e.g., employees of an enterprise/organization) when detected network traffic may be lower for prolonged periods of time and/or busy seasons when network traffic inspection increases (e.g., during end-of-year cycles). As another example, training can be performed monthly to continue to learn the impact of changes in traffic patterns on cloud firewall usage costs.

The conceptual diagrams indicate an example in which one machine learning model is trained and used for generation of predicted usage costs, whether the model is trained on traffic log data and corresponding usage costs obtained for one cloud environment or across multiple cloud environments (e.g., for one customer or for multiple customers). In implementations, a plurality of models can be trained and utilized, where each of the plurality of models corresponds to one of a plurality of sizes of cloud firewalls that are available for deployment. As an example, if the cloud firewalls that are available are represented as small, medium, and large, three models are trained on traffic log data and corresponding usage cost metric values obtained for cloud firewalls of the corresponding size. In other words, the system can determine the size of cloud firewall to which obtained traffic log data and associated usage cost metric values correspond and utilizes the obtained data for training a model corresponding to that size of cloud firewall. Usage cost predictions can then be generated based on input of feature vectors into each of the plurality of models corresponding to the plurality of cloud firewall sizes, and outputs will indicate the predicted usage cost specific to the corresponding size of cloud firewall. The generation of multiple models that correspond to each of the cloud firewall sizes available for deployment and prediction of usage costs for each cloud firewall size allows for direct comparison of predictions for each size as part of informing decisions of cloud firewalls to deploy or terminate as part of cost optimization and/or cloud firewall autoscaling.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 309-315 of FIG. 3 can be performed in parallel or concurrently across traffic classes. With respect to FIGS. 1 and 2, rather than processing raw traffic log data or traffic log data and usage cost data (for neural network training and generation of predictions with the trained neural network, respectively) to generate labeled or unlabeled feature vectors, already-processed data comprising magnitudes of detected network traffic detected for each of a set of traffic classes and any corresponding labels of cloud firewall usage cost for a plurality of intervals of time can be provided to the system 111 (e.g., in a file). It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
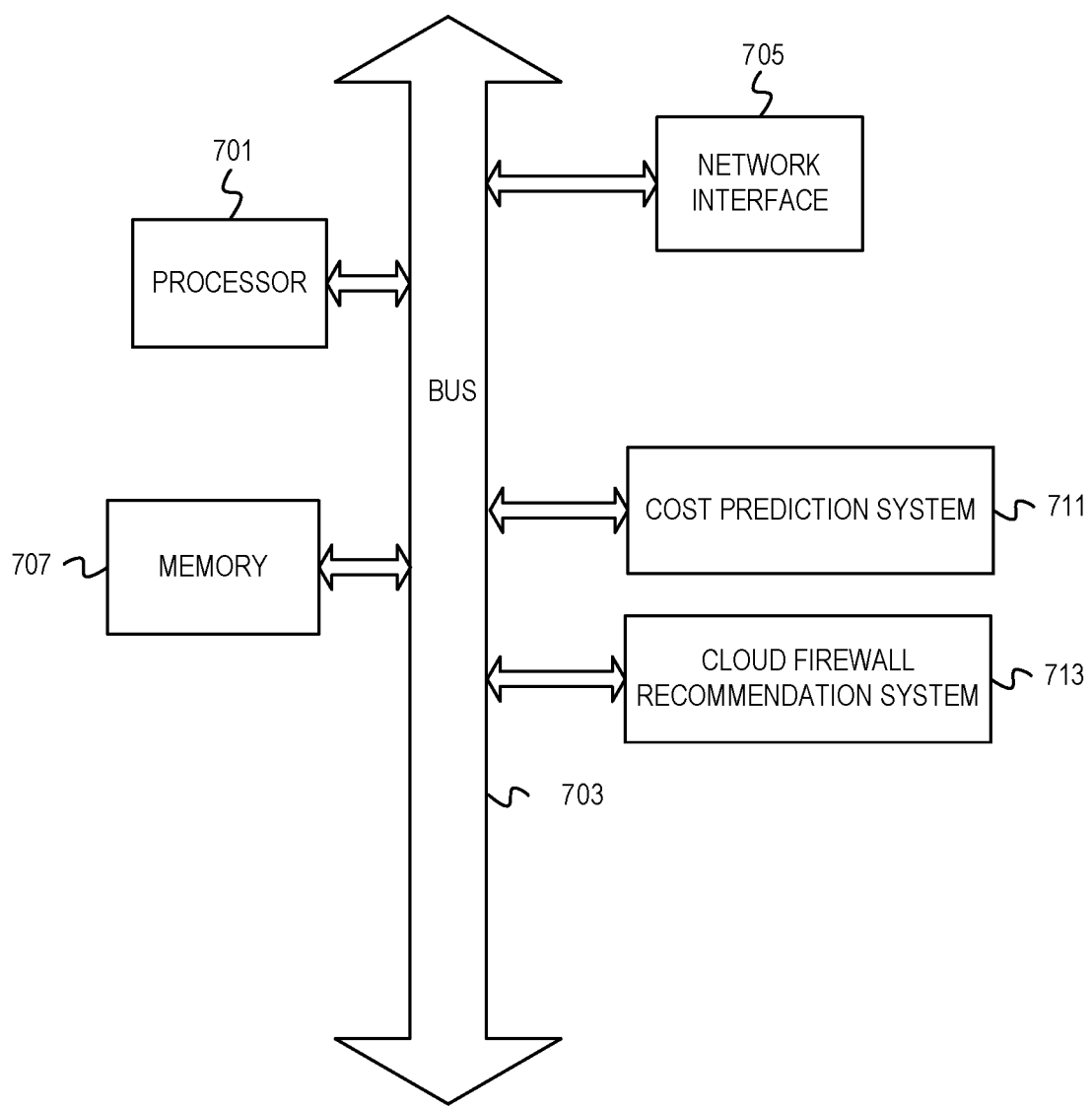
FIG. 7 depicts an example computer system with a cost prediction system and a cloud firewall recommendation system.

FIG. 7 depicts an example computer system with a cost prediction system and a cloud firewall recommendation system. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes cost prediction system 711 and cloud firewall recommendation system 713. The cost prediction system 711 learns relationships between magnitudes of network traffic detected across a set of traffic classes by one or more cloud firewalls and accumulated usage costs accumulated as a result of detection and inspection of the network traffic having the distribution across traffic classes by the cloud firewalls. The cloud firewall recommendation system 713 recommends optimal scaling of cloud firewalls based on usage costs predicted from observed traffic patterns in terms of magnitudes of network traffic detected across traffic classes. However, the cost prediction system 711 and cloud firewall recommendation system 713 do not necessarily execute as part of the same system. For instance, each entity may execute on a respective server. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for traffic pattern-based prediction of costs associated with inspection of network traffic by cloud-based firewalls as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
 training a first model with first training data to learn cloud firewall usage costs based on magnitudes of network traffic detected for each of a plurality of traffic classes represented in the first training data,
  wherein the first training data comprises a plurality of associations between logged network traffic that indicates magnitudes of network traffic across the plurality of traffic classes and usage costs recorded for a cloud firewall,
  wherein the logged network traffic was logged by the cloud firewall;
 generating, with the trained first model, a predicted usage cost based on an input feature vector that at least indicates first logged network traffic across the plurality of traffic classes; and
 determining a recommendation for cloud firewall scaling based on the predicted usage cost.

2. The method of claim 1, wherein the plurality of associations comprises a plurality of feature vectors and corresponding plurality of labels, wherein each of the plurality of feature vectors indicates magnitudes of network traffic of each of the plurality of traffic classes logged by the cloud firewall during a logging period and each of the plurality of labels corresponds to a usage cost recorded for the cloud firewall during the logging period.

3. The method of claim 2, wherein the logging period comprises at least one of an interval of time, a day of week, and a month.

4. The method of claim 1, wherein training the first model comprises training a deep neural network, and wherein the trained first model comprises a trained deep neural network.

5. The method of claim 1, wherein the usage costs recorded for the cloud firewall comprise at least one of central processing unit (CPU) utilization, memory utilization, and monetary cost recorded for the cloud firewall, and wherein the predicted usage cost comprises at least one of predicted CPU utilization, predicted memory utilization, and predicted monetary cost.

6. The method of claim 1, wherein generating the predicted usage cost comprises obtaining a prediction of usage costs from output of the trained first model based on providing the input feature vector to the trained first model.

7. The method of claim 1 further comprising:
based on determining that the predicted usage cost corresponds to a decrease in network traffic, determining at least one of a size and quantity of cloud firewalls to which to scale down,
wherein determining the recommendation comprises determining the at least one of the size and quantity of cloud firewalls.

8. The method of claim 7, wherein determining that the predicted usage cost corresponds to a decrease in network traffic comprises determining that the predicted usage cost is a threshold amount less than a current usage cost associated with the cloud firewalls.

9. The method of claim 1 further comprising:
based on determining that the predicted usage cost corresponds to an increase in network traffic, determining at least one of a size and quantity of cloud firewalls to which to scale up,
wherein determining the recommendation comprises determining the at least one of the size and quantity of cloud firewalls.

10. The method of claim 9, wherein determining that the predicted usage cost corresponds to an increase in network traffic comprises determining that the predicted usage cost is a threshold amount greater than a current usage cost associated with the cloud firewall.

11. The method of claim 1 further comprising indicating the recommendation for cloud firewall scaling.

12. One or more non-transitory machine-readable media having executable program code stored thereon, the program code comprising instructions to:
generate a plurality of labeled feature vectors based on obtained traffic log data and values of usage cost metrics collected for one or more cloud firewalls,
wherein each of the obtained traffic log data and values of usage cost metrics correspond to a same interval of time,
wherein the traffic log data were generated by the one or more cloud firewalls; and
train, with the plurality of labeled feature vectors, a first model to learn a relationship between magnitudes of network traffic across a plurality of traffic classes detected during a time interval and usage cost metric values recorded during the time interval,
wherein training of the first model results in a trained first model that accepts input feature vectors that indicate magnitudes of network traffic across the plurality of traffic classes and outputs predictions of usage cost metric values.

13. The non-transitory machine-readable media of claim 12, wherein the instructions to generate the plurality of labeled feature vectors comprise instructions to generate a plurality of feature vectors indicating magnitudes of network traffic detected for the plurality of traffic classes and label each of the plurality of feature vectors with a corresponding one of the values of usage cost metrics.

14. The non-transitory machine-readable media of claim 13, wherein the values of the usage cost metrics comprise at least one of recorded central processing unit (CPU) utilization, recorded memory usage, and recorded monetary cost, and wherein the instructions to label each of the plurality of feature vectors comprise instructions to label each of the plurality of feature vectors with at least one of a value of CPU utilization, a value of memory usage, and a value of monetary cost.

15. The non-transitory machine-readable media of claim 12, wherein the instructions to train the first model comprise instructions to train a deep neural network, wherein the trained first model comprises a trained deep neural network.

16. An apparatus comprising:
a processor; and
a non-transitory computer-readable medium having instructions stored thereon that are executable by the processor to cause the apparatus to,
train a first model with first training data to learn usage costs based on magnitudes of network traffic detected for each of a plurality of traffic classes represented in the first training data,
wherein the first training data comprise a plurality of associations between logged network traffic across the plurality of traffic classes and usage costs recorded for a plurality of cloud firewalls,
wherein the logged network traffic was logged by the plurality of cloud firewalls; and
predict, with the trained first model, a usage cost associated with the plurality of cloud firewalls based on an input feature vector that at least indicates first logged network traffic across the plurality of traffic classes.

17. The apparatus of claim 16, wherein the plurality of associations comprises a plurality of feature vectors and corresponding plurality of labels, wherein each of the plurality of feature vectors indicates magnitudes of network traffic of each of the plurality of traffic classes logged by the plurality of cloud firewalls during a logging period and each of the plurality of labels corresponds to an aggregate usage cost recorded for the plurality of cloud firewalls during the logging period.

18. The apparatus of claim 16, wherein the instructions executable by the processor to cause the apparatus to train the first model comprise instructions executable by the processor to cause the apparatus to train a deep neural network.

19. The apparatus of claim 16, wherein the instructions executable by the processor to cause the apparatus to predict the usage cost comprise instructions executable by the processor to cause the apparatus to provide the input feature vector to the trained first model and obtain a predicted usage cost from output of the trained first model.

20. The apparatus of claim 16 further comprising instructions executable by the processor to cause the apparatus to,
based on a determination that the predicted usage cost corresponds to an increase or decrease in usage cost associated with the plurality of cloud firewalls, determine a recommendation for cloud firewall scaling based on the predicted usage cost; and
indicate the recommendation for cloud firewall scaling.

* * * * *